United States Patent
Shogaki

(10) Patent No.: US 9,729,739 B2
(45) Date of Patent: Aug. 8, 2017

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Yohei Shogaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/989,721

(22) Filed: Jan. 6, 2016

(65) Prior Publication Data
US 2016/0198052 A1 Jul. 7, 2016

(30) Foreign Application Priority Data
Jan. 7, 2015 (JP) ................................ 2015-001677

(51) Int. Cl.
*H04N 1/00* (2006.01)
*G06F 3/0484* (2013.01)
*G06F 3/0488* (2013.01)

(52) U.S. Cl.
CPC ..... *H04N 1/00392* (2013.01); *G06F 3/04845* (2013.01); *G06F 3/04883* (2013.01); *H04N 1/0044* (2013.01); *H04N 1/00411* (2013.01); *H04N 1/00469* (2013.01); *G06F 2203/04806* (2013.01); *H04N 2201/0094* (2013.01)

(58) Field of Classification Search
CPC .................................................. H04N 1/00392
See application file for complete search history.

(56) References Cited

U.S. PATENT DOCUMENTS

| 5,930,006 A | * | 7/1999 | Yoshida | H04N 1/3875 358/401 |
| 2013/0212525 A1 | * | 8/2013 | Shogaki | G06F 3/04845 715/799 |
| 2014/0153060 A1 | * | 6/2014 | Takahashi | H04N 1/00411 358/468 |

FOREIGN PATENT DOCUMENTS

JP 2013190982 A 9/2013

* cited by examiner

*Primary Examiner* — Ibrahim Siddo
(74) *Attorney, Agent, or Firm* — Canon USA, Inc., IP Division

(57) ABSTRACT

In response to a start of a pinch-out operation in a first display area displaying a preview image, display is switched from a first display mode to a second display mode, and in a case where a pinch-in operation in the first display area ends and a display size of the preview image reaches a predetermined threshold, the display is switched from the second display mode to the first display mode.

14 Claims, 4 Drawing Sheets

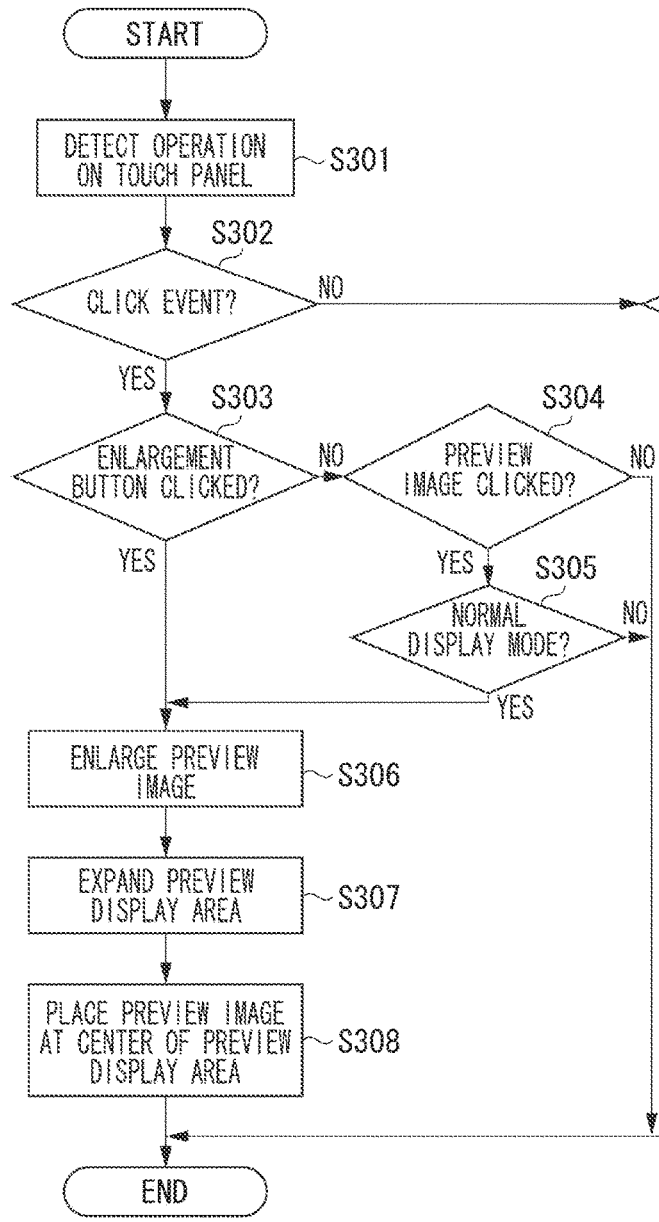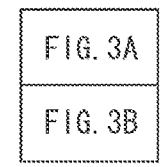

IMAGE PROCESSING APPARATUS, CONTROL METHOD FOR IMAGE PROCESSING APPARATUS, AND STORAGE MEDIUM

BACKGROUND OF THE INVENTION

Field of the Invention

The present disclosure generally relates to image processing and, more particularly, to an image processing apparatus, a control method for the image processing apparatus, and a storage medium.

Description of the Related Art

In recent years, an image processing apparatus with a touch panel capable of detecting multi-touch operations to allow an intuitive user operation has become widespread. Such a multi-touch operation performed on the touch panel includes pinch-in and pinch-out. The pinch-in is an operation of moving two fingers as if pinching an object displayed on a touch panel with the two fingers. This operation allows a user to reduce the object size intuitively. The pinch-out is an operation of moving two fingers as if stretching an object displayed on a touch panel with the two fingers. This operation allows a user to enlarge the object size intuitively.

Japanese Patent Application Laid-Open No. 2013-190982 discusses reducing an enlarged image displayed on a display, based on a pinch-in operation, and ending enlargement display of the image when a display scaling factor of the image becomes equal to or below a predetermined threshold.

In this case, when an image is enlarged and displayed, a screen layout may be different from a screen layout before the image is enlarged and displayed. For example, various operation buttons for the displayed image may be displayed before the image is enlarged and displayed, and these operation buttons may be hidden when the image is enlarged and displayed. In such a case, if a user continually performs operations for increasing and decreasing the distance between two fingers while touching the surface of a touch panel, the image is enlarged and reduced alternately. At that time, if whether a display size of the image exceeds a threshold is set as the only condition for switching between display and non-display of the above-described operation buttons, switching between two display forms having different screen layouts occurs continually. As a result, the screen viewed by the user flickers, which may hinder provision of comfortable operability.

The present disclosure is directed to a technique capable of providing comfortable operability for a user, in switching between two display modes having different screen layouts, based on a multi-touch operation.

SUMMARY OF THE INVENTION

According to an aspect of the present disclosure, an image processing apparatus with a touch panel, includes a detection unit configured to be capable of detecting a touch of an input instruction member on the touch panel, and a position of the touch of the input instruction member, and a release of the input instruction member touching the touch panel from the touch panel, and a display control unit configured to be capable of switching between a first display mode for displaying a screen including a first display area for displaying a preview image and a second display area different from the first display area, and a second display mode for expanding the first display area to be larger than the first display area in the first display mode, and hiding the second display area, or reducing the second display area and displaying the reduced second display area, wherein, in the first display mode, in a case where the detection unit detects an increase in a distance between at least two input instruction members from a state where the at least two input instruction members are in contact with the first display area, the display control unit enlarges the preview image displayed in the first display area, and switches the display to the second display mode, and wherein, in the second display mode, in a case where the detection unit detects a decrease in a distance between at least two input instruction members from a state where the at least two input instruction members are in contact with the first display area, the display control unit reduces the preview image displayed in the first display area, and in a case where the detection unit detects a release of at least one of the at least two input instruction members from the first display area, the display control unit switches the display to the first display mode.

Further features of the present disclosure will become apparent from the following description of exemplary embodiments with reference to the attached drawings.

DESCRIPTION OF THE EMBODIMENTS

An exemplary embodiment of the present disclosure will be described below with reference to the drawings. The following exemplary embodiment is not intended to limit the disclosure according to the scope of claims, and any combination of features described in the exemplary embodiment is not necessarily essential to a solution in the disclosure.

Figure 1:
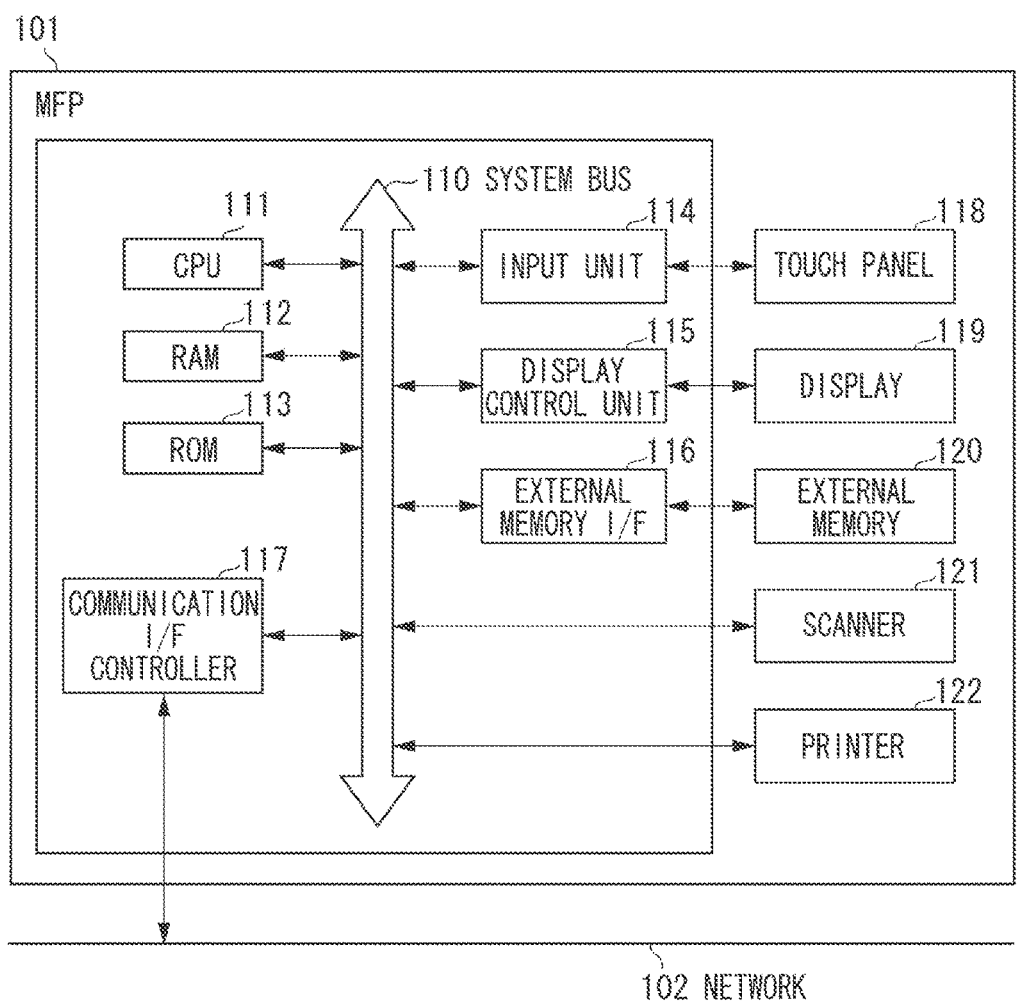
FIG. 1 is a block diagram illustrating an example hardware configuration of an image processing apparatus according to an exemplary embodiment of the present invention.

FIG. 1 is a block diagram illustrating an example hardware configuration of an image processing apparatus according to the present exemplary embodiment. Referring to FIG. 1, a multi function peripheral (MFP) is described as an example of the image processing apparatus.

An MFP 101 includes various units such as a central processing unit (CPU) 111 and a printer 122. The CPU 111, a random access memory (RAM) 112, a read only memory (ROM) 113, an input unit 114, a display control unit 115, an external memory interface (I/F) 116, and a communication I/F controller 117 are connected to a system bus 110. Further, a touch panel 118, a display 119, and an external memory 120 are connected to the system bus 110. The processing units are configured to be capable of exchanging data via the system bus 110 with each other. As used herein, the term "unit" generally refers to any combination of software, firmware, hardware, or other component, such as circuitry, that is used to effectuate a purpose.

The ROM 113 is a nonvolatile memory, and stores image data, other kinds of data, various programs for operation of the CPU 111, and the like, in the respective predetermined areas. The RAM 112 is a volatile memory, and used as a temporary storage area serving as a main memory, a work area, and the like for the CPU 111. The CPU 111 uses the RAM 112 as a work memory, according to a program stored in the ROM 113, for example, thereby controlling each part of the MFP 101. The programs for operating the CPU 111 may be stored beforehand in the external memory 120 (such as a hard disk), without being limited to the ROM 113.

The input unit 114 receives a user operation, and generates a control signal according to the received operation. The input unit 114 then supplies the generated control signal to the CPU 111. For example, the input unit 114 receives the user operation from a keyboard (not illustrated), a mouse (not illustrated), or the touch panel 118 serving as an input device. The touch panel 118 is an input device configured to output coordinate data according to, for example, a touched position on a flat input section. The CPU 111 controls each part of the MFP 101 according to a program, based on the control signal generated and then supplied by the input unit 114 in response to the user operation performed on the input device. The MFP 101 can thereby operate according to the user operation.

The display control unit 115 outputs a display signal for causing the display 119 to display an image. For example, the CPU 111 generates a display control signal according to a program, and supplies the generated display control signal to the display control unit 115. Based on this display control signal, the display control unit 115 generates a display signal and outputs the generated display signal to the display 119. For example, the display control unit 115 causes the display 119 to display a graphical user interface (GUI) screen forming a GUI, based on the display control signal generated by the CPU 111.

The touch panel 118 is integrally configured with the display 119, and serves as a touch panel display. For example, a manufacturer configures the touch panel 118 to have enough light transmittance not to disturb display of the display 119, and attaches the touch panel 118 to an upper layer of a display surface of the display 119. The manufacturer then associates input coordinates on the touch panel 118, with display coordinates on the display 119. This forms a GUI in which the user can directly operate a screen displayed on the display 119. The touch panel 118 may be of any of various types including a resistive type, a capacitive type, an optical type, a surface acoustic wave type, an infrared type, an electromagnetic induction type, an image recognition type, and an optical sensor type.

To the external memory I/F 116, the external memory 120 is mountable. Examples of the external memory 120 include a hard disk, a floppy (registered trademark) disk, a compact disc (CD), a digital versatile disc (DVD), and a memory card. The external memory I/F 116 reads data from and writes data into the mounted external memory 120, based on the control by the CPU 111.

The communication I/F controller 117 performs communication for a network 102, which is, for example, any of various kinds of networks such as a local area network (LAN), the Internet, and wire and wireless networks, based on the control by the CPU 111. For example, the communication I/F controller 117 allows image data generated by a scanner 121 to be transmitted outside via the network 102, and allows image data received from outside via the network 102 to be printed by the printer 122. Various devices such as a personal computer (PC), a different MFP, a printer, and a server are connected to the network 102, to be able to communicate with the MFP 101.

The scanner 121 generates image data by reading an image on an original document. The generated image data is stored into the RAM 112, the ROM 113, or the like. The printer 122 prints out the image data onto a print medium, based on a user instruction input via the input unit 114 or a command input from an external device via the communication I/F controller 117. Further, a copy function is implemented by causing the printer 122 to perform printing based on the image data generated by the scanner 121.

The CPU 111 can identify, for example, gesture operations and states on the touch panel 118. The gesture operations and states include a touch by a finger or pen (an input instruction member) on the touch panel 118 (hereinafter, referred to as "touch-start"), and a movement of the finger or pen while touching the touch panel 118 (hereinafter, referred to as "touch-move"). The gesture operations and states further include a release of the finger or pen from the touch panel 118 (hereinafter, referred to as "touch-end"), a state where there is no touch on the touch panel 118 (hereinafter, referred to as "touch-off"), and the like. The CPU 111 is notified of information representing these operations and position coordinates of the finger or pen touching the touch panel 118, via the system bus 110. The CPU 111 can identify an operation performed on the touch panel 118, based on the received information. As for the touch-move, a moving direction of the finger or pen moving on the touch panel 118 can also be determined for each of a vertical component and a horizontal component on the touch panel 118, based on a change in the position coordinates. Further, an operation of quickly performing the touch-end after the touch-start on the touch panel 118 is referred to as "click". Furthermore, when the touch-end is performed after performing the touch-move for a certain distance from when the touch-start has been performed on the touch panel 118, it is assumed that the drawing of "stroke" is performed. An operation of quickly drawing the stroke is referred to as "flick". The flick is an operation of quickly moving a finger for some distance while keeping the finger touching a touch panel, and then releasing the finger from the touch panel. In other words, the flick is an operation of quickly sliding the finer on the touch panel, like flipping the touch panel. The CPU 111 determines that the flick is performed, when detecting a movement of the input instruction member for a predetermined distance or longer at a predetermined speed or higher, and subsequently detecting the touch-end, based on a change in the position coordinates of the detected touch-move. Further, the CPU 111 determines that a drag is performed, when detecting a movement of the input instruction member for a predetermined distance or longer, based on a change in the position coordinates of the detected touch-move.

Further, the touch panel 118 supports multi-touch, and is capable of simultaneously detecting two or more positions subjected to touch-on or touch-move. There is a case where two input instruction members such as fingers or stylus-pens touching on a touch panel, and from this state, one or both of the fingers are moved to increase or decrease the distance between two points, in a direction of connecting the two points. A user operation of bringing two fingers closer to or away from each other is similar to an act of pinching or stretching an object with fingers, and is therefore called "pinch operation". An operation of increasing the distance between two fingers is referred to as "pinch-out", and an operation of decreasing the distance between two fingers is referred to as "pinch-in".

The pinch operation is normally performed with a thumb and a forefinger of a user. When each or one of touch positions is moved from a state where two points are simultaneously touched, the CPU 111 determines that the pinch operation has started. Further, the CPU 111 can calculate the coordinates of a center point of a line segment connecting the two points in the pinch operation, and the distance between the two points. The CPU 111 instructs the display control unit 115 to enlarge a displayed image, when the distance between the touch positions at the two points is equal to or greater than a predetermined value stored beforehand in a storage area. When the finger or pen leaves the touch panel 118 so that there is one or no touch, the CPU 111 detects this state as the touch-end, and determines that the pinch-out operation has ended. Similarly, the CPU 111 instructs the display control unit 115 to reduce the displayed image, when the distance between the touch positions at the two points is equal to or less than a predetermined value stored beforehand in a storage area. When the finger or pen leaves the touch panel 118 so that there is one or no touch, the CPU 111 detects this state as the touch-end, and determines that the pinch-in operation has ended.

Next, a preview function of the MFP 101 will be described. In the present exemplary embodiment, the preview function is a function of causing the display 119 to display image data stored in the RAM 112 or the external memory 120. The CPU 111 performs display control for causing the display 119 to display a preview screen including one or more pages. In other words, the CPU 111 generates image data in a format suitable for display on the display 119, among the stored image data. The image data in the format suitable for the display in the display 119 is hereinafter referred to as "preview image". The image data stored in the external memory 120 may be configured of two or more pages. In this case, the preview image is generated for each of the pages. The preview function is not limited to a preview before printing by the printer 122, and is applicable to all uses, for confirming contents of image data.

The MFP 101 can store the image data into the RAM 112 or the external memory 120 by some ways. For example, the MFP 101 stores image data generated from an image on an original document read by the scanner 121. Alternatively, the MFP 101 stores image data received from an external device such as a PC or the like connected to the network 102, via the communication I/F controller 117. Alternatively, the MFP 101 stores image data received from a portable storage medium (such as a Universal Serial Bus (USB) memory and a memory card) mounted to the external memory I/F 116. The MFP 101 may store image data into the external memory 120, in any other ways. The stored image data may be data reflecting various kinds of setting information including print setting information for an original document read by the scanner 121. Further, the image data displayed on the display 119 may include character information, or image information such as a picture and a graphic image, or may include both of these kinds of information, and/or other kinds of information. Furthermore, the image data may be a sample image internally stored beforehand.

Figure 2A:
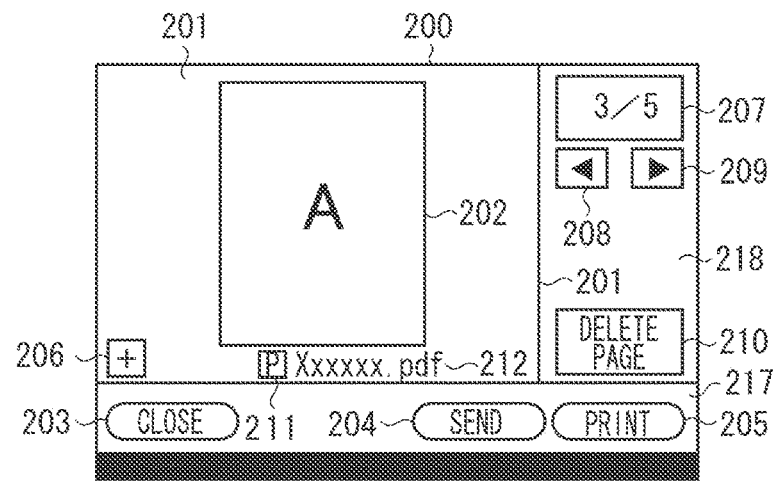
FIGS. 2A, 2B, and 2C are diagrams each illustrating an example of a screen displayed on a display of the image processing apparatus.
Figure 2B:
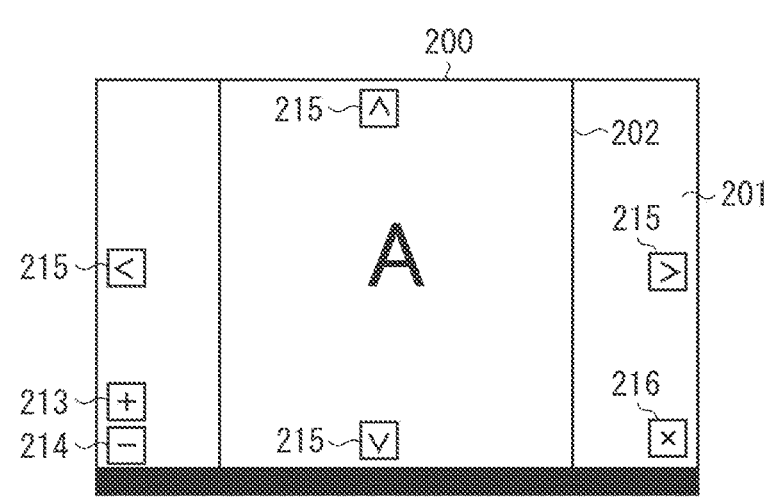
Figure 2C:
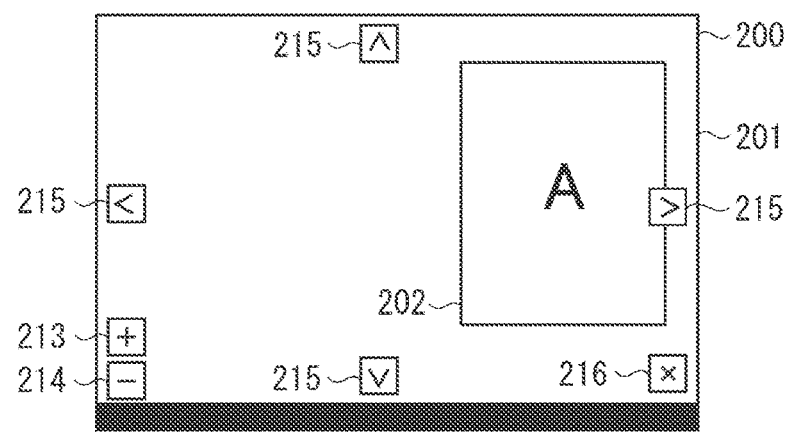

FIGS. 2A, 2B, and 2C are screen examples each illustrating a preview image displayed on the display 119 of the MFP 101. A preview screen 200 illustrated in FIG. 2A is provided to display a preview image, and includes a preview display area 201, a navigation area 217, and a page control area 218.

The preview display area 201 is provided to display a preview image 202, and can receive a gesture operation of the user. In the present exemplary embodiment, a preview image for one page is displayed in the preview display area 201, but two or more pages may be simultaneously displayed. The CPU 111 of the MFP 101 detects a gesture operation for the preview display area 201, and can operate display of the preview image 202. Examples of the gesture operation include the above-described flick, drag, pinch-in, and pinch-out, but any other operation may be adopted as the gesture operation. The area that receives the gesture operation may include an area around the preview display area 201.

The preview image 202 is an image created by reducing/enlarging the stored image data to a size suitable for display. Alternatively, the preview image 202 may be an image created based on various settings including print settings for image data.

A close (CLOSE) button 203 is a button for closing the preview screen 200, and shifting the screen to a different screen. When the user touches this button, the CPU 111 ends the preview function.

A transmission instruction (SEND) button 204 is a button used to provide an instruction for transmitting the displayed image data. When the user touches this button, the CPU 111 performs transmission processing for transmitting the image data to an external device such as a PC connected to the network 102. Further, the CPU 111 closes the preview screen 200, and shifts the screen to a different screen. The CPU 111 hides the transmission instruction button 204, in a state where information for transmission (such as a transmission destination) is not set before a shift to the preview screen 200. To stop the transmission processing, a stop button (not illustrated) is provided. When the user touches the stop button, the CPU 111 stops the transmission processing, and closes the preview screen 200, to shift the screen to a different screen. The CPU 111 hides the stop button, in a state where information for transmission is not set before a shift to the preview screen 200. When the stop button is displayed, the close button 203 is hidden.

A print instruction (PRINT) button 205 is a button used to provide an instruction for printing the displayed image data. When the user touches instruction button 205, the CPU 111 causes the printer 122 to start print processing, and closes the preview screen 200, and shifts the screen to a different screen. In a state where information for printing (such as an output sheet size, and the number of output copies) is not set, the CPU 111 hides the print instruction button 205.

A preview image enlargement button 206 is provided to enlarge the preview image 202 displayed in the preview display area 201, and to display the enlarged preview image 202. When the user touches the preview image enlargement button 206, the CPU 111 increases the size of the preview image 202, and then displays the preview image 202 in the preview display area 201.

A page number display area 207 is provided to display the total number of pages and the page number corresponding to the currently displayed preview image 202, when the image data includes two or more pages. When the displayed page is changed, the CPU 111 determines what page number corresponds to the preview image 202, and updates the display content of the page number display area 207. In the example of FIG. 2A, the total number of pages is five, and the third page is currently displayed.

A page backward button 208 is a change button used to provide a page change instruction for moving backward from the displayed preview image 202 to the previous page, when the image data includes two or more pages. When the user touches the page backward button 208, the CPU 111 reads out the image data corresponding to the previous page, and displays the previous page by replacing the currently displayed preview image 202 with the previous page. Alternatively, when two or more pages are simultaneously displayed in the preview display area 201, the CPU 111 updates the display content, so that the preview image 202 corresponding to the previous page is placed at the center of the preview display area 201.

A page forward button 209 is a change button used to provide a page change instruction for moving forward from the displayed preview image 202 to the next page, when the image data includes two or more pages. When the user touches the page forward button 209, the CPU 111 reads out the image data corresponding to the next page, and displays the next page by replacing the currently displayed preview image 202 with the next page. Alternatively, when two or more pages are simultaneously displayed in the preview display area 201, the CPU 111 updates the display content, so that the preview image 202 corresponding to the next page is placed at the center of the preview display area 201.

A page deletion (DELETE PAGE) button 210 is provided to delete the page corresponding to the displayed preview image 202, from the image data. When the user touches the page deletion button 210, the CPU 111 displays a deletion confirmation screen (not illustrated) to be overlaid on the preview screen 200, thereby prompting the user to select whether to delete the corresponding page from the image data.

A file type display area 211 is provided to display a file type associated with the displayed image data. When the format of the image data is Portable Document Format (PDF), the CPU 111 displays an image indicating PDF, in the file type display area 211. When the format is Joint Photographic Experts Group (JPEG), the CPU 111 displays an image indicating JPEG. When no file type is associated with the image data, the CPU 111 hides the file type display area 211.

A file name display area 212 is provided to display a file name associated with the displayed image data. When no file name is associated with the image data, the CPU 111 hides the file name display area 212.

The navigation area 217 is provided to display various buttons, which are each used to provide an instruction for performing processing for the preview image 202. The navigation area 217 displays the close button 203, the transmission instruction button 204, and the print instruction button 205. The buttons in the navigation area 217 are associated with a display condition of the navigation area 217. When the navigation area 217 is not displayed, the close button 203, the transmission instruction button 204, and the print instruction button 205 are not displayed either.

The page control area 218 is provided to display various buttons, which are each used to control the page of the preview image 202 displayed in the preview display area 201. The page control area 218 displays the page number display area 207, the page backward button 208, the page forward button 209, and the page deletion button 210. The buttons and area in the page control area 218 are associated with a display condition of the page control area 218. When the page control area 218 is not displayed, the page number display area 207, the page backward button 208, the page forward button 209, and the page deletion button 210 are not displayed either.

Here, enlargement display control for the preview image 202 by the pinch-out operation of the user will be described. In the present exemplary embodiment, the user can enlarge and display the preview image 202, by performing the pinch-out operation while touching the preview display area 201 with fingers, or pens. In addition, with the enlargement of the preview image 202, the navigation area 217 and the page control area 218 are hidden, and the range of the preview display area 201 occupying the preview screen 200 is expanded.

Assume that the pinch-out operation for the preview display area 201 is performed, and the amount of a change in the distance between touch positions at two points becomes a predetermined value or greater. The CPU 111 then changes the layout of the preview screen 200, and performs processing of increasing the display size of the preview image 202 according to the amount of the change. Further, the CPU 111 identifies touch center coordinates of touch positions at two or more points, and places the preview image 202 at a position enlarged with reference to the identified touch center coordinates, relative to the preview display area 201.

In addition, with the enlargement of the preview image 202, the navigation area 217 and the page control area 218 are hidden, and the display of the preview display area 201 occupying the preview screen 200 is expanded.

The navigation area 217 and the page control area 218 may be hidden simultaneously with processing of enlarging the preview image 202. Alternatively, the navigation area 217 and the page control area 218 may be hidden when a movement occurs for a distance equal to or greater than a predetermined value, which is different from the predetermined value for determination of the pinch-out operation and stored beforehand in a storage area.

The preview screen 200 in FIG. 2B represents an example in which the CPU 111 enlarges the preview image 202 and expands the preview display area 201, by receiving the pinch-out operation performed by the user. In the present exemplary embodiment, FIG. 2A is referred to as "normal display mode", and FIG. 2B is referred to as "enlargement display mode". In other words, the normal display mode indicates a state where the preview display area 201, the navigation area 217, and the page control area 218 are displayed on the preview screen 200. The enlargement display mode indicates a state where the navigation area 217 and the page control area 218 are not displayed, the preview display area 201 is expanded, and a preview image enlargement button 213 through a close button 216 are displayed, on the preview screen 200.

The preview image enlargement button 213 is provided to enlarge the preview image 202 displayed in the preview display area 201, and to display the enlarged preview image 202. The preview image enlargement button 213 has a role similar to the role of the preview image enlargement button 206, in terms of enlargement display of the preview image 202. The preview image enlargement button 206 and the preview image enlargement button 213 may have different enlargement ratios. Thus, the preview image 202 enlarged at an optimum enlargement ratio for each display mode can be displayed. In the present exemplary embodiment, the enlargement ratio is determined in three levels. The preview image 202 is displayed in the preview display area 201, while having the display size corresponding to the enlargement ratio increased by one level each time a touch on the preview image enlargement button 213 is detected.

A preview image reduction button 214 is provided to reduce the preview image 202 displayed in the preview display area 201, and to display the reduced preview image 202. When the user touches the preview image reduction button 214, the CPU 111 reduces the preview image 202 to a predetermined display size and displays the reduced preview image 202 in the preview display area 201.

A preview image movement button 215 is provided to move the display position of the preview image 202 displayed in the preview display area 201. When the user touches the preview image movement button 215, the CPU 111 moves the display position of the image for a predetermined movement amount, and displays the moved image in the preview display area 201. The display area of the preview image 202 moves in a direction indicated by each pressed button.

The close button 216 is provided to end the enlargement display mode, to cause a change to a screen layout of the normal display mode. When the user touches the close button 216, the CPU 111 changes the display content from the enlargement display mode to the normal display mode.

Here, control for performing reduction display of the preview image 202 by the pinch-in operation of the user will be described. In the present exemplary embodiment, the user can reduce and display the preview image 202, by performing the pinch-in operation while touching the preview display area 201 with fingers, or pens.

Assume that the pinch-in operation for the preview display area 201 is performed, and the amount of a change in the distance between touch positions at two points becomes equal to or less than a predetermined value. The CPU 111 then performs processing of reducing the display size of the preview image 202 according to the amount of the change. Further, the CPU 111 identifies touch center coordinates of touch positions at two or more points, and places the preview image 202 at a position reduced with reference to the identified touch center coordinates, relative to the preview display area 201.

Further, when detecting the touch-end and determining that the pinch-in operation has ended, the CPU 111 changes the display content from the enlargement display mode to the normal display mode, if the display size of the preview screen 200 is equal to or less than a predetermined threshold. The CPU 111 then hides the preview image enlargement button 213 thorough the close button 216, and displays the navigation area 217 and the page control area 218.

The user can continually switch between the pinch-out operation and the pinch-in operation, while touching the touch panel 118 with the fingers, or the pens. For example, if the user increases and decreases the distance between two fingers continually, while touching the surface of the touch panel 118 with the two fingers, the display size of the preview image 202 increases and decreases alternately. Here, assume that the display size of the preview image 202 in the normal display mode is a reference size (100%), and whether the display size of the preview image 202 exceeds 100% is the only condition for switching between the enlargement display mode and the normal display mode. In this case, switching between the two display modes is frequently performed. As a result, the screen viewed by the user flickers, due to enlargement and reduction of the preview display area 201, as well as display and non-display of the navigation area 217 and the page control area 218. Therefore, in the present exemplary embodiment, a condition for switching from the normal display mode to the enlargement display mode by the pinch operation is different from a condition for switching from the enlargement display mode to the normal display mode by the pinch operation. More specifically, the condition for switching from the normal display mode to the enlargement display mode is a state where the display size of the preview image 202 exceeds 100%. In other words, the condition in this case is a state where the distance between the two points is increased by the pinch-out operation, and the amount of a change in this increase exceeds a predetermined value. On the other hand, the condition for switching from the enlargement display mode to the normal display mode is a state where the display size of the preview image 202 is decreased to or below 100% by the pinch-in operation, and the touch-end operation is performed. For example, when the user starts the pinch-out operation in the normal display mode, and then if the display size of the preview image 202 exceeds 100%, switching to the enlargement display mode occurs even if there is a finger or pen touching the surface of the touch panel 118. On the other hand, when the user starts the pinch-in operation in the enlargement display mode, switching to the normal display mode does not occur as long as there is a finger or pen touching the surface of the touch panel 118, even if the display size of the preview image 202 becomes equal to or less than 100%. The switching to the normal display mode occurs, when the finger or pen leaves. Next, a specific example of a method of changing the display position of the preview image 202 displayed in the preview display area 201 will be described. When detecting a drag operation for the preview display area 201, the CPU 111 of the MFP 101 identifies a direction and a movement amount of the drag operation. According to the direction and the movement amount of the drag operation, the display position of the preview image 202 in the preview display area 201 is changed. For example, for a drag operation to move a touch position for a specific distance in a rightward direction, the display position of the preview image 202 relative to the preview display area 201 is moved in the rightward direction for the specific distance. When the preview image 202 is reduced and displayed by performing the pinch-in operation in the enlargement display mode in FIG. 2B, and then the drag operation in the rightward direction is performed, a preview screen in FIG. 2C appears. Here, if the pinch-in operation is further performed, and thereby the enlargement display mode is switched to the normal display mode, the navigation area 217 and the page control area 218 may be located at a position overlapping the preview image 202. Therefore, when the pinch-in operation is determined to have ended, and the layout is switched from the enlargement display mode to the normal display mode, the preview image 202 is moved to and displayed at a portion not overlapping the navigation area 217 and the page control area 218. For example, the preview image 202 is placed so that the center of the preview image 202 coincides with the center of the preview display area 201 of the normal display mode.

This prevents such an inconvenience that the user cannot press a button or cannot confirm information due to the preview image 202 overlapping the navigation area 217 and the page control area 21. Therefore, the user can be provided with high operability.

Further, as a method of switching from the normal display mode to the enlargement display mode, switching by an operation other than the pinch-out operation may be adopted. For example, the CPU 111 may switch the display content from the normal display mode to the enlargement display mode, when the user touches the preview image enlargement button 206. In another method, the CPU 111 may switch the display content from the normal display mode to the enlargement display mode, when the user clicks the preview image 202 or the preview display area 201 in the normal display mode.

Furthermore, as a method of switching the display content from the enlargement display mode to the normal display mode, switching by an operation other than the pinch-out operation and the touch on the close button 216 may be adopted. For example, the CPU 111 may switch the layout from the enlargement display mode to the normal display mode, if the CPU 111 determines that the display size of the preview image 202 is smaller than a predetermined display size, when the user touches the preview image reduction button 214. Such switching between the modes by one or more methods has an effect of improving usability of the user.

Figure 3B:
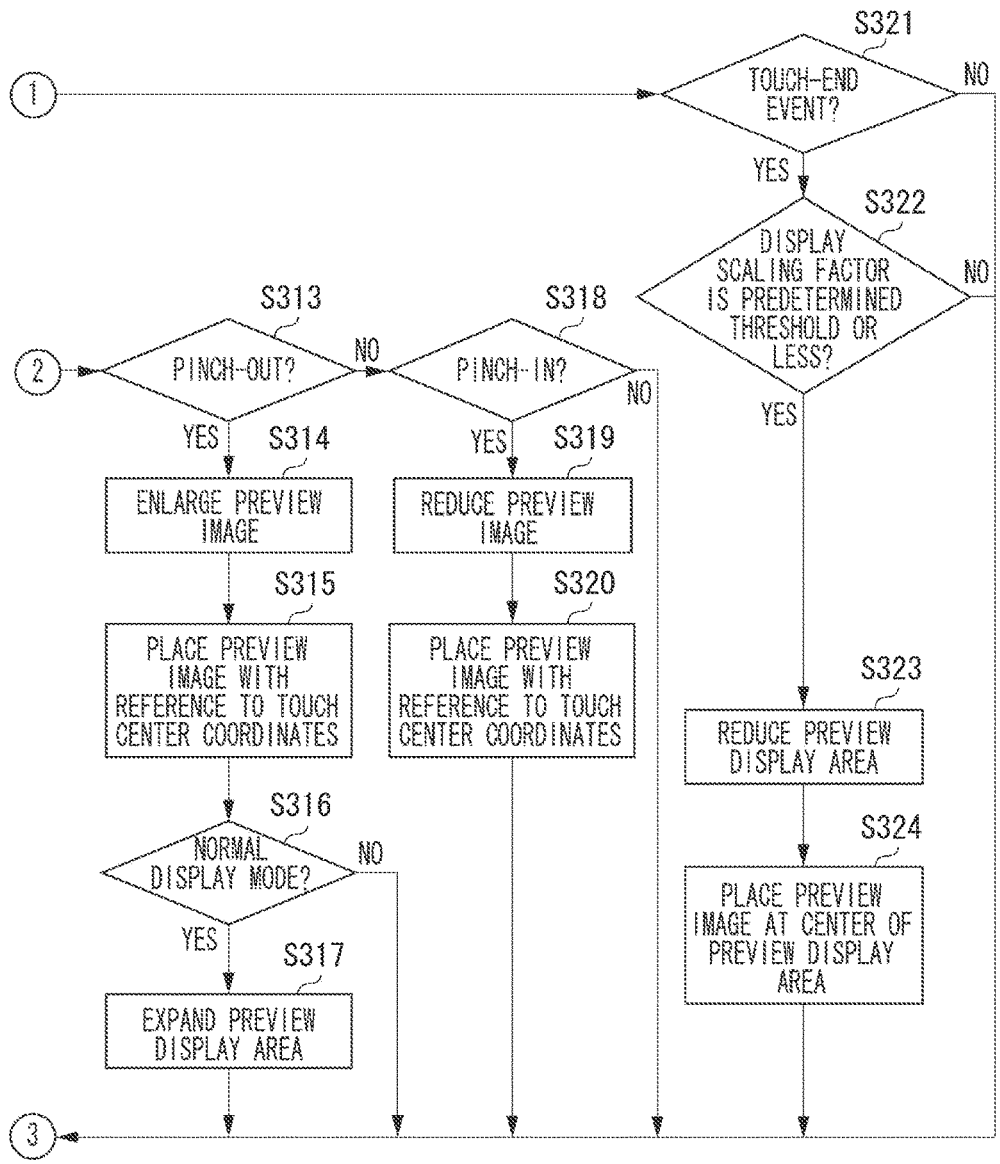
FIG. 3 (consisting of FIGS. 3A and 3B) is a flowchart illustrating display switching processing for a preview screen.

Next, a series of processes for changing the display content of the preview screen 200 displayed in the display 119 by the user operation will be described in detail, with reference to a flowchart in FIG. 3 (consisting of FIGS. 3A and 3B). The CPU 111 of the MFP 101 performs the process in each step in FIG. 3, by executing a program. The program to be executed is stored in a memory such as the ROM 113 and the external memory 120, and is executed by being loaded in the RAM 112.

In step S301, the CPU 111 receives a user operation performed on the touch panel 118. Next, in step S302, the CPU 111 determines whether the operation detected in step S301 is a click operation. When the detected operation is determined to be a click operation (YES in step S302), the processing proceeds to step S303. When the detected operation is determined not to be a click operation (NO in step S302), the processing proceeds to step S309.

In step S303, the CPU 111 determines whether the click operation is an operation performed on the preview image enlargement button 206. When the click operation is determined to be an operation performed on the preview image enlargement button 206 (YES in step S303), the processing proceeds to step S306. When the click operation is determined not to be an operation performed on the preview image enlargement button 206 (NO in step S303), the processing proceeds to step S304. In step S304, the CPU 111 determines whether the click operation is an operation for the preview image 202. When the click operation is determined to be an operation performed on the preview image 202 (YES in step S304), the processing proceeds to step S305. When the click operation is determined not to be an operation performed on the preview image 202 (NO in step S304), no display change is performed for the preview display area 201. Processing to be performed in this case is different from the processing for a display change for the preview image 202 and the preview display area 201. However, such processing is not directly related to the present disclosure, and therefore will not be described.

In step S305, the CPU 111 determines whether the display content of the current preview screen 200 corresponds to the normal display mode. Only in the normal display mode, display switching to the enlargement display mode including processing of expanding the preview display area 201 is performed by receiving the click operation for the preview image 202. When it is determined to correspond to the normal display mode (YES in step S305), the processing proceeds to step S306. When it is determined not to correspond to the normal display mode (NO in step S305), the CPU 111 performs no display change for the preview image 202 and the preview display area 201.

In step S306, the CPU 111 increases the display size of the preview image 202. Further, in step S307, the CPU 111 expands the preview display area 201, by hiding the navigation area 217 and the page control area 218. Furthermore, in step S308, the CPU 111 changes the display position of the preview image 202, so that the center of the preview image 202 increased in the display size and the center of the preview display area 201 are at the same position.

In step S309, the CPU 111 determines whether the event detected in step S301 is a touch-move event. When the detected event is determined to be a touch-move event (YES in step S309), the processing proceeds to step S310. When the detected event is determined not to be a touch-move event (NO in step S309), the processing proceeds to step S321.

In step S310, based on the detected touch-move event, the CPU 111 determines whether the operation of the user is a drag operation. When the detected touch-move event includes only one point, and a change in position coordinates of this point becomes equal to or longer than a predetermined distance, the operation is determined to be a drag operation. The operation is determined not to be a drag operation, when the detected touch-move event includes two or more points. When the operation is determined to be a drag operation (YES in step S310), the processing proceeds to step S311. When the operation is determined not to be a drag operation (NO in step S310), the processing proceeds to step S313. In step S311, the CPU 111 determines whether the display of the current preview screen 200 corresponds to the enlargement display mode. Only in the enlargement display mode, processing of changing the display position of the preview image 202 is performed by receiving the drag operation for the preview image 202. When the display is determined to correspond to the enlargement display mode (YES in step S311), the processing proceeds to step S312. When the display is determined not to correspond to the enlargement display mode (NO in step S311), the CPU 111 performs no display change for the preview image 202 and the preview display area 201. In step S312, the CPU 111 changes the display position of the preview image 202 relative to the preview display area 201, according to a direction and a movement amount of this drag.

In step S313, the CPU 111 determines whether the touch-move operation is a pinch-out operation. More specifically, based on a change in the position coordinates of the detected touch-move event including the two points, the CPU 111 determines whether there is a movement in a direction of increasing the distance between the touch positions at the two points. The CPU 111 also determines whether a difference between the distance of the touch positions at the two points when initially detected, and the distance after the movement of at least either one of the two points, exceeds the above-described predetermined value. When the touch-move operation is determined to be a pinch-out operation (YES in step S313), the processing proceeds to step S314. When the touch-move operation is determined not to be a pinch-out operation (NO in step S313), the processing proceeds to step S318.

In step S314, the CPU 111 increases the display size of the preview image 202. Further, in step S315, the CPU 111 places the preview image 202 at a position enlarged with reference to the touch center coordinates.

In step S316, the CPU 111 determines whether the display of the current preview screen 200 corresponds to the normal display mode. When the display is determined to correspond to the normal display mode (YES in step S316), the processing proceeds to step S317. When the display is determined not to correspond to the normal display mode (NO in step S316), no display change is performed for the preview image 202 and the preview display area 201. In step S317, the CPU 111 expands the preview display area 201, by hiding the navigation area 217 and the page control area 218. In other words, when the pinch-out operation begins in the normal display mode, display switching from the normal display mode to the enlargement display mode is performed.

In step S318, the CPU 111 determines whether the touch-move operation is a pinch-in operation. More specifically, based on a change in the position coordinates of the detected touch-move event including the two points, the CPU 111 determines whether there is a movement in a direction of decreasing the distance between the touch positions at the two points. The CPU 111 also determines whether a difference between the distance of the touch positions at the two points when initially detected, and the distance after the movement of at least either one of the two points, exceeds the above-described predetermined value. When the touch-move operation is determined to be a pinch-in operation (YES in step S318), the processing proceeds to step S319. When the touch-move operation is determined not to be a pinch-in operation (NO in step S318), no display change is performed for the preview image 202 and the preview display area 201. In step S319, the CPU 111 reduces the display size of the preview image 202. Further, in step S320, the CPU 111 places the preview image 202 at a position reduced with reference to the touch center coordinates.

In step S321, the CPU 111 determines whether the operation detected in step S301 is a touch-end operation. When the operation is determined to be a touch-end operation (YES in step S321), the processing proceeds to step S322. When the operation is determined not to be a touch-end operation (NO in step S321), no display change is performed, and the processing ends.

In step S322, the CPU 111 determines whether the display size of the preview image 202 is equal to or less than a predetermined threshold. When the received event is a touch-end operation due to a release of the finger or pen from the pinch-in operation, and the display size of the preview image 202 becomes equal to or less than the threshold, the display content is switched from the enlargement display mode to the normal display mode. Here, assume that, the display size of the preview image 202 displayed in the normal display mode is a reference value (a display scaling factor of 100%), and reduction of the display scaling factor to 100% by the pinch-in is a condition for switching to the normal display mode. In the present exemplary embodiment, the same display size as the preview image 202 displayed in the normal display mode is assumed to be the threshold. When the CPU 111 determines that the display size of the preview image 202 is equal to or less than the predetermined threshold (YES in step S322), the processing proceeds to step S323. When the display size of the preview image 202 is not equal to or less than the predetermined threshold (NO in step S322), no processing is performed.

In step S323, the CPU 111 hides some or all of the preview image enlargement button 213 through the close button 216, while displaying the navigation area 217 and the page control area 218, and reduces the preview display area 201. In other words, the CPU 111 switches the display content from the enlargement display mode to the normal display mode.

In step S324, the CPU 111 changes the display position of the preview image 202, so that the center of the preview image 202 and the center of the reduced preview display area 201 are at the same position.

As described above, according to the present exemplary embodiment, the condition for switching the display content of the preview screen 200 from the normal display mode to the enlargement display mode is different from the condition for switching the display content of the preview screen 200 from the enlargement display mode to the normal display mode by the pinch operation.

More specifically, the condition for switching from the normal display mode to the enlargement display mode is the timing at which the start of the pinch-out operation (start of a movement of a finger) is detected. On the other hand, the condition for switching from the enlargement display mode to the normal display mode is the timing at which the end of the pinch-in operation (a release of a finger) is detected. In performing two-way switching between two different display contents, i.e., between the normal display mode and the enlargement display mode, the start of the pinch-out operation and the end of the pinch-in operation having no continuity therebetween are provided as the conditions. Therefore, no flickering phenomenon occurs, so that comfortable operability can be provided.

Further, the switching conditions of the enlargement display mode and the normal display mode may be reversed. More specifically, the condition for switching from the normal display mode to the enlargement display mode may be the timing at which the end of the pinch-out operation (a release of a finger) is detected. Further, as for the switching from the enlargement display mode to the normal display mode, a state where the display size of the preview image 202 reaches a predetermined threshold may be provided as the only condition, without setting the end of the pinch-in operation as the condition.

In addition, according to the present exemplary embodiment, other than the buttons for operating the preview image 202 and the button for ending the enlargement display mode, the buttons are not displayed in the enlargement display mode. Therefore, unnecessary buttons are not displayed, which produces an effect of enhancing convenience.

Moreover, in the present exemplary embodiment, the navigation area 217 and the page control area 218 are described to be hidden in the enlargement display mode, but only either one may be hidden. Alternatively, the display area may be reduced and displayed in the enlargement display mode, without hiding the navigation area 217 and the page control area 218.

According to the present exemplary embodiment, the preview image enlargement button 213 and the preview image reduction button 214 are displayed in the enlargement display mode, but another configuration may be employed. For example, when the display content is switched from the normal display mode to the enlargement display mode by the pinch-out operation, the preview image enlargement button 213 and the preview image reduction button 214 may be hidden. In this case, the number of displayed buttons is smaller, which reduces confusion for the user, thereby producing an effect of enhancing convenience.

In the above-described exemplary embodiment, the MFP is taken as an example of the device implementing the present disclosure. However, the device implementing the present disclosure is not limited to the MFP. In other words, the present disclosure is applicable to image processing apparatuses that are at least capable of processing image data, including image formation apparatuses such as a print apparatus, a scanner, a facsimile, and a digital camera, as well as image processing apparatuses such as a PC and a mobile information terminal, without being limited to the MFP.

The present disclosure is also implemented by executing the following processing. First, software (a computer program) that implements the functions of the above-described exemplary embodiment is supplied to a system or apparatus via a network or storage medium. Next, a computer (or a CPU or MPU) of the system or apparatus reads the program and then executes the read program. In this case, the program and the storage medium storing the program form an exemplary embodiment of the present disclosure.

According to an exemplary embodiment of the present disclosure, a user can be provided with comfortable operability, in switching between two display modes having different screen layouts, based on a multi-touch operation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-001677, filed Jan. 7, 2015, which is hereby incorporated by reference herein in its entirety.

What is claimed is:

1. An image processing apparatus with a touch panel comprising at least one processor that executes a program to function as:
    a detection unit configured to be capable of detecting a touch of an input instruction member on the touch panel, and a position of the touch of the input instruction member, and a release of the input instruction member touching the touch panel from the touch panel;
    a display control unit configured to be capable of switching between a first display mode for displaying a screen including a first display area for displaying a preview image and a second display area in which the preview image is not displayed, the second display area being for displaying at least one button for operating the preview image being displayed on the first display area, and a second display mode for expanding the first display area to be larger than the first display area in the first display mode, and hiding the second display area, or reducing the second display area and displaying the reduced second display area; and
    a calculation unit configured to calculate a distance between or among at least two input instruction members touching the first display area, based on the detecting result of the detection unit,
    wherein, based on the distance between or among at least two input instruction members touching the first display area, the display control unit enlarges or reduces the preview image being displayed in the first display area, and switches between the first display mode and the second display mode based on enlargement or reduction in size of the preview image.

2. The image processing apparatus according to claim 1, wherein, in the first display mode, in a case where the distance between or among the at least two input instruction members touching the first display area is a predetermined value or more, the display control unit enlarges the preview image being displayed in the first display area and switches from the first display mode to the second display mode, and wherein, in the second display mode, in a case where the distance between or among the at east two input instruction members touching the first display area is a predetermined value or less, the display control unit reduces the preview image being displayed in the first display area, and, in a case where it is detected that the number of input instruction members touching the first display area, among the at least two input instruction members, becomes equal to or less than one, the display control unit switches from the second display mode to the first display mode.

3. The image processing apparatus according to claim 2, wherein, in the second display mode, in a case where it is detected that the number of input instruction members touching the first display area, among the at least two input instruction members, becomes equal to or less than one, and a display size of the preview image becomes equal to or less than a predetermined threshold, the display control unit switches from the second display mode to the first display mode.

4. The image processing apparatus according to claim 3, wherein, in the second display mode, in a case where it is detected that the number of input instruction members touching the first display area, among the at least two input instruction members, becomes equal to or less than one, and the display size of the preview image is greater than a predetermined size, the display control unit omits to switch from the second display mode to the first display mode.

5. The image processing apparatus according to claim 2, wherein, when the second display mode is switched to the first display mode, the display control unit places the preview image, so as to match centers of the first display area and the preview image.

6. The image processing apparatus according to claim 1, further comprising a storage unit configured to store image data,
    wherein, in the first display area, a preview image of the image data stored in the storage unit is displayed.

7. The image processing apparatus according to claim 1, wherein, in the first display area, one or a plurality of preview images is displayed.

8. The image processing apparatus according to claim 1, wherein, in the second display area, at least one of a transmission instruction button used to provide an instruction for transmitting the preview image displayed in the first display area, and a print instruction button used to provide an instruction for printing the preview image displayed in the first display area, is displayed.

9. The image processing apparatus according to claim 1, wherein, in the second display area, at least one of a change button used to change a page of the preview image displayed in the first display area, and a deletion button used to delete a page corresponding to the preview image displayed in the first display area is displayed.

10. The image processing apparatus according to claim 1, further comprising a reading unit configured to generate an image by reading an image on an original document.

11. The image processing apparatus according to claim 1, further comprising a printing unit configured to print an image.

12. The image processing apparatus according to claim 1, wherein, in the first display mode, in a case where the distance between or among the at least two input instruction members touching the first display area is a predetermined value or more, the display control unit enlarges the preview image being displayed in the first display area and, in a case where it is detected that the number of input instruction members touching the first display area, among the at least two input instruction members, becomes equal to or less than one, the display control unit switches from the first display mode to the second display mode, and wherein, in the second display mode, in a case where the distance between or among the at least two input instruction members touching the first display area is a predetermined value or less, the display control unit reduces the preview image being displayed in the first display area, and in a case where a display size of the preview image becomes equal to or less than a predetermined threshold, the display control unit switches from the second display mode to the first display mode.

13. A control method for an image processing apparatus having a touch panel and capable of detecting a touch of an input instruction member on the touch panel, and a position of the touch of the input instruction member, and a release of the input instruction member touching the touch panel from the touch panel, the control method comprising:
    controlling display to switch between a first display mode for displaying a screen including a first display area for displaying a preview image and a second display area in which the preview image is not displayed, the second display area being for displaying at east one button for operating the preview image being displayed on the first display area, and a second display mode for expanding the first display area to be larger than the first display area in the first display mode, and hiding the second display area, or reducing the second display area and displaying the reduced second display area; and
    calculating a distance between or among at least two input instructions members touching the first display area, cased on the detecting result,
    wherein, based the distance between or among at least two input instruction members touching the first display area, enlarging or reducing the preview image being displayed in the first display area, and switching between the first display mode and the second display mode based on enlargement reduction in size of the preview image.

14. A non-transitory storage medium storing a program for causing a computer to execute a control method for an image processing apparatus having a touch panel and capable of detecting a touch of an input instruction member on the touch panel, and a position of the touch of the input instruction member, and a release of the input instruction member touching the touch panel from the touch panel, the control method comprising;
    controlling display to switch between a first display mode for displaying a screen including a first display area for displaying a preview image and a second display area in which the preview image is not displayed, the second display area being for displaying at least one button for operating the preview image being displayed on the first display area, and a second display mode for expanding the first display area to be larger than the first display area in the first display mode; and hiding the second display area, or reducing the second display area and displaying the reduced second display area; and
    calculating a distance between or among at least two input instructions members touching the first display area, based on the detecting result,
    wherein; based the distance between or among at least two input instruction members touching the first display area, enlarging or reducing the preview image being displayed in the first display area, and switching between the first display mode and the second display mode based on enlargement reduction in size of the preview image.

* * * * *